United States Patent [19]
Wilson et al.

[11] Patent Number: 5,974,056
[45] Date of Patent: Oct. 26, 1999

[54] METHOD OF AND APPARATUS FOR TRANSMISSION OF DATA

[75] Inventors: Jeffrey D. Wilson, River Vale, N.J.; Johannes Bardach, Vienna, Austria

[73] Assignee: Frequentis Nachrichtentechnik Gesellschaft m.b.H., Wien, Austria

[21] Appl. No.: 08/600,399

[22] Filed: Feb. 12, 1996

[30] Foreign Application Priority Data

Jan. 10, 1996 [AT] Austria ............................ 42/96

[51] Int. Cl.[6] ............................................. H04J 3/06
[52] U.S. Cl. ................................................ 370/509
[58] Field of Search ................... 370/438, 439, 370/440, 442, 443, 444, 445, 446, 447, 448, 449, 450, 451, 452, 453, 454, 455, 456, 457, 458, 459, 460, 461, 462, 509, 510, 511, 512, 513, 514, 515, 522, 503

[56] References Cited

U.S. PATENT DOCUMENTS

| | | | |
|---|---|---|---|
| 4,736,366 | 4/1988 | Rickard | 370/439 |
| 4,818,985 | 4/1989 | Ikeda | 370/439 |
| 5,140,680 | 8/1992 | Best | 370/438 |
| 5,200,949 | 4/1993 | Kobayashi | 370/228 |
| 5,210,750 | 5/1993 | Nassehi et al. | 370/440 |
| 5,214,645 | 5/1993 | Hagirahim | 370/440 |
| 5,396,494 | 3/1995 | Roposh | 370/439 |
| 5,410,542 | 4/1995 | Gerbehy et al. | 370/364 |
| 5,416,910 | 5/1995 | Moyer et al. | 370/438 |
| 5,497,370 | 3/1996 | Hamada et al. | 370/438 |
| 5,519,726 | 5/1996 | Dicarlo | 370/461 |
| 5,654,531 | 8/1997 | Farabee et al. | 370/228 |

*Primary Examiner*—Huy D. Vu
*Attorney, Agent, or Firm*—Darby & Darby

[57] ABSTRACT

A method and apparatus for transmission of data for voice, signaling data, air traffic control facilities, telephone equipment, communication systems, etc., wherein the data are transmitted in the form of data packets comprising preamble, header, data, and/or signal bytes via—if necessary—a dual bus between preferably decentralized stations connected to the bus, wherein the stations receive the data for transmission from connected peripheral devices, e.g. microphones, telephone equipment, loudspeakers, keyboards, line interfaces, radio equipment, etc., and the stations transmit received data via these peripheral units, and wherein the station clock pulse is synchronized by a synchronizing signal transmitted from a master station. In each station a device, e.g. a Manchester decoder, which recognizes preambles which are shortened in comparison with Ethernet preambles, is connected between the station-internal data processing unit, e.g., a digital signal processor, a microcontroller, etc., and the bus.

34 Claims, 2 Drawing Sheets

METHOD OF AND APPARATUS FOR TRANSMISSION OF DATA

BACKGROUND OF THE INVENTION

1. Field of the Invention

The invention relates to a method for transmission of data, in particular voice and/or signaling data, preferably for air traffic control facilities, telephone equipment, communication systems, etc., wherein the data are transmitted in the form of data packets comprising preamble, header, data, and/or signal bytes via—if necessary—a dual bus between preferably decentralized stations connected to the bus, wherein the stations receive the data for transmission from connected peripheral devices, e.g. microphones, telephone equipment, loudspeakers, keyboards, line interfaces, radio equipment, etc., and the stations transmit received data via these peripheral units, and wherein the station clock pulse is synchronized by a synchronizing signal transmitted from a master station.

In addition, the invention relates to an apparatus for transmission of data, in particular voice and/or signaling data, preferably for air traffic control facilities, telephone equipment or communication systems, comprising—if necessary—a dual bus and decentralized stations connected to the bus, with peripheral devices, e.g. telephone equipment, microphones, loudspeakers, keyboards, line interfaces, wireless equipment, etc., connected to these stations, wherein the clock of the individual stations is adjusted by a synchronizing signal transmitted from a master station.

2. Description of the Related Art

A method and an apparatus of the aforementioned type are described, for instance, in U.S. Pat. No. 5,434,861.

SUMMARY OF THE INVENTION

It is the object of the invention to improve such method and such apparatus and make the method and apparatus reliable while at the same time keeping the design simple and achieving a high transmission rate. Frequently, synchronization of the individual stations must occur quickly and accurately, and a change in the configuration of the apparatus should be easily accomplished by connecting or disconnecting individual stations. In particular, when the method or the apparatus according to the invention is employed at air traffic control facilities, care has to be taken that the voice data and the pertinent signaling data are transmitted quickly from one station to another station, i.e. within a specified minimum time period.

This is accomplished by the inventive steps described above, in that, before data transmission begins, a master station which transmits—with a specified repeat frequency—to the bus a start packet defining the beginning of a frame, is selected or assigned among the preferably equivalent stations according to specified criteria; in that the individual stations are arranged or placed in a specified order and that consecutive time periods or time windows are assigned to the stations in this specified order within the frame generated by the master station, during which time windows the individual stations transmit their data packets to the bus; and in that the start packet which determines the beginning of the frame, is employed by all stations as a synchronizing signal and as a basis, respectively, for the respective station clock or for the timing in the respective station. An apparatus of the aforementioned type according to the invention is characterized in that each station comprises a device, for instance a Manchester decoder, which recognizes preambles which are shortened in comparison with Ethernet preferably Manchester-encoded preambles, and which is connected between the data processing unit of the station, e.g. a digital signal processor, a micro controller, etc., and the bus.

According to the invention, a number of equivalent, decentralized stations are arranged along a bus which select a master station at the beginning of the operation. This selection is based on communication among the individual stations according to specified criteria. This simplifies the design of the apparatus, since the individual stations can be identical as far as their communication devices are concerned. Preferably, the individual stations are synchronized with a fixed phase relationship via the start packets transmitted by the master station at the beginning of a frame which represent synchronization signals which apply to all stations. With each transmission or at the beginning of each frame, the individual stations are synchronized anew with a fixed phase relationship. Central clocks which would be common to all stations and which can lead to problems with the transmission and setting of the station's clock pulse, are not required. Each synchronized station is assigned a specific time period within the frame during which the respective station can transmit or send data to the bus. Hereby, it is exactly known or predetermined for each station, at which point in time (after receipt of the start packet) and for how long it can send data to the bus, without being required to request unblocking from a central station. This method is different from a token ring where the time periods are assigned depending on demand; according to the invention, the assignment is fixed, but can be altered for certain time periods, it remains, however, always deterministic. The method according to the invention does therefore also not correspond to the procedures employed in CSMA-CD or TDM transmissions, like, for instance, PCM-30.

One of the disclosed methods provides a rather simple, but still very accurate adjustment and good agreement of the clocks or time bases of the individual stations. This method is characterized in that the clock pulse which is independently generated in each station, or the frequency which forms the basis for the clock pulse, can be adjusted or adapted depending on the time difference between the expected and the actual arrival time of a start packet, wherein the clock of the respective station is preferably adjusted when each start packet arrives. This makes it possible that the individual stations can begin their transmission exactly at the specified time at the start of their assigned time period and can end their transmission exactly at the specified end of the time period or the time allotted for transmission. When a station recognizes a delay in the reception of the synchronizing signal, it will slow its clock rate; if the signal is received too early, the clock pulse is accelerated.

It is also within the invention to adjust the clock which is independently generated in each of the stations, and the frequency, as forming the basis for the clock, depending on the time difference between the expected and the actual arrival time of the start packet and to adjust the clock of the each of the plurality of stations according to the arrival of the start packet.

Another method lists a number of possibilities for determining the order of the individual stations along the bus. Here, the stations are arranged along a bus depending on their serial number, depending on identification numbers assigned to them, depending on randomly assigned, but different large numbers, or depending on their sequence or physical order; and that the stations arranged in this order transmit their data packets sequentially to the bus during the assigned time window of the frame.

A further choice for selecting the master station is provided in yet another method, wherein a station located at the beginning or at the end of the bus is selected as master station.

It should be mentioned that each node transmits its packet 500 times per second. Very short packets (19 bytes) are used with extremely short times between packets (1.6, $\mu$s). Short Inter Packet Delays are necessary for high channel capacity at low latency. Normally, this would be unworkable, simply due to propagation delay, not to mention the delays encountered going though regenerative repeaters.

The solution to the problem is to place the timing reference at one end of the network, then poll the nodes in physical order down the cable. Each node contains its physical ID code (serial number) that represents its time slot on the network. At the far end of the cable, all the packets will appear spaced at (16.8, $\mu$s) intervals, since the propagation delay of the time reference to each node plus the propagation delay to the far end of the cable is constant.

At the near end of the cable, propagation delay will tend to spread out the packets. The delay of each packet is the propagation delay of the time reference signal to the node plus the propagation delay of the packet transmitted from the node to the near end. Since the nodes are polled in physical order, this delay is guaranteed only to increase after each packet, and the extra delay between any two successive packets is always twice the propagation between the two sending nodes.

The end result of this is that the packets will never run into each other due to propagation delay, and the round-trip propagation delay of the network need be allowed for only once per frame rather than once per packet. Since packets, especially in the initial gap, are transmitted out of order, this delay is actually imposed twice.

A simplification of the transmission protocols and a standardization of the structure can be achieved with yet another method. Here, it is contemplated that only a limited number of data packets having different lengths is transmitted by the stations. It is, however, essential that only relatively short data packets containing short preambles and short headers, are transmitted, in order to optimize the ratio of the transmitted voice and/or signaling bytes to the required preamble and header bytes. The length and position of the time window assigned to the individual stations within the frame via the transmission can be changed via the transmission of demand notifications between the plurality of stations. The transmission capacity and transmission speed is increased by yet another method wherein the data packets consist of preferably 22 bytes and are formed with preambles which are shortened in comparison with Ethernet preambles and consist of preferably 2 bytes, and with headers which are shortened in comparison with Ethernet preambles and consist of preferably 2 to 3 bytes.

Even if a deterministic transmission network is established, the method of claim 6 can be utilized. The allocation or change of the time slot allocated to the respective stations is, however, not at the discretion of the individual stations, but is a result of considering the transmission capacity and the transmission requirements, respectively, of the entire system.

For this purpose, it is advantageous to employ another method, wherein the data packets are formed with a preamble whose byte count is at most 10% of the total length of the data packet. Or, another disclosed method is advantageous, wherein the data packets are formed with a header whose byte count is at most 15% of the total length of the data packet.

High redundancy and security of the transmission is achieved via a method, wherein a signal transmission or an information exchange to or among the other stations for selecting a new master station is initiated in each station, after a time period exceeding the duration of a frame, in particular after exceeding a time period corresponding to an integer multiple of the duration of a frame, has passed and no start packet was received during this time period; or that in the respective station or in each station where the absence of a start packet was noticed, a start packet is formed and transmitted to the bus, and that the station which was the first to send a new start packet to all stations, is recognized as new master station. In the event of an error, a new master station can be selected in that the individual stations wait a certain time period to see if another start packet of a frame occurs. Preferably, this time period in the individual stations corresponds to a multiple of the frame duration plus a period of time which is necessary to transmit the frame from the former master station to the individual stations. Each station which notices that a frame is absent, sends a start packet to the bus, followed by a number of undefined signals in order to achieve a certain signal duration. If no other station sends a similar signal to the bus, then this start packet is recognized by all stations and these stations synchronize with this start packet, and the station which sent this start packet, is recognized as the new master station. If, however, two or more stations send a new start packet because the waiting period in all these stations was exceeded, then these stations will notice that at least one other station has sent a start packet, and subsequently will wait a multiple of the previous waiting time before sending another start packet, and then will send a new start signal, etc. Here it is assumed that the time difference between two start packets sent by different stations will multiply due to the lengthening of the waiting times for the stations which had—at different times— previously sent a start packet, and that a station will have finished sending a start packet before the other station(s) are beginning with their transmission. This way, the station which transmitted a start packet to all stations without interference, is recognized as the new master station.

The transmission of the start packet, the station clocks in each station is adjusted in a fixed phase relationship.

Optimum conditions for data transmission are achieved by a method, wherein for a number of data channels between 5 and 1000, preferably between 5 and 300, and a transmission capacity between 4 kbits/s and 8.5 Mbits/s per channel, preferably between 60 kbits/s and 130 kbits/s, a frame frequency between 100 and 1000 Hz, preferably 500 Hz, and a length of a packet between 12 and 84 bytes, preferably between 15 and 30 bytes, is selected. Herein, the individual parameters are optimized while, at the same time, adapting best to the existing technical conditions, fast transmission speed and large transmission capacity. A bus employed may have a bandwidth between 1 and 155 Mbits/s.

For transmitting information, i.e. system-internal data and signals, a method is utilized, wherein a time window (initial gap) is provided within the frame between the start packet and the time window assigned to the first station transmitting after the master station, for the transmission of packets of system data and/or system signals between the stations, for instance for selecting a master station, for assigning and changing time slots, or for transmitting system parameters. This time window is allocated to individual stations when needed; the individual stations negotiate among themselves and/or with the master station.

Further optimization of the data transmission can be accomplished via a method wherein data packets are created, such that following a single preamble which is shortened in comparison with Ethernet preambles and preferably consists of 2 bytes, is a plurality of consecutive data packets, preferably not more than 8, each preferably having a total length of 17 to 18 bytes, without preambles and each having only one header which is shortened in comparison with Ethernet headers and preferably consists of 2 to 3 bytes. By reducing the preambles of the individual data packets or by omitting the preambles entirely, the ratio of the bytes required for the preambles and the header to the bytes available for the data transmission is further improved.

To simplify physical nodes that generate several channels packet transmissions may be concatenated. The concatenated packet does not contain a preamble and is sent immediately after he initial packet. Note that con catenated packets use up less transmission time, as preamble and interpacket delays do not need to be duplicated: Concatenating two packets provides audio and digital signalling rate that are compatible with ISDN 2B+D lines. Each packet would contain 1 B channel and one half of the D channel.

In order to be able to recognize the data packets with short preambles in the individual stations, a method is used in which in each station, the data between the station-internal data processing unit, e.g. a digital signal processor, and the bus are routed via a device, e.g. a Manchester decoder, which recognizes the preambles which are shortened in comparison to Ethernet preambles and which are preferably Manchester encoded.

In each station the start packets which are transmitted at the beginning of each frame, are compared with a preset fixed value for identification and if the identification is positive, the station-internal clock is adjusted using the start packet so as to set a time reference for the transmission time window. Further, the device which recognizes the shortened preambles, supplies the data to or extracts the data from the data processing unit which incudes a digital signal processor and/or a microcontroller, via the S-PORT.

An apparatus according to the invention is advantageously realized by an embodiment wherein in each station a device, e.g. a Manchester decoder, which recognizes preambles which are shortened in comparison with Ethernet preambles and which are preferable Manchester encoded, is connected between the station-internal data processing unit, e.g., a digital signal processor, a microcontroller, etc., and the bus. Further, an embodiment is provided, wherein the data processing unit of each station comprises an identification device, in particular a comparator with memory for a preset number, for recognizing the start packet defining the beginning of a frame, to which identification device the station-internal clock which is synchronized or coordinated with the start packet, is connected. Even further, an embodiment is provided, wherein the device recognizing the shortened preambles is connected to the S-PORT of the data processing unit. Also, an interface logic may be connected between the data processing unit and the device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the following, the invention is further described with reference to the drawing.

FIGS. 3 and 3a–3e shows data packets and transmission protocols, some of which are known in the art and others are created according to the invention.

DETAILED DESCRIPTION OF THE PRESENTLY PREFERRED EMBODIMENTS

Figure 1:
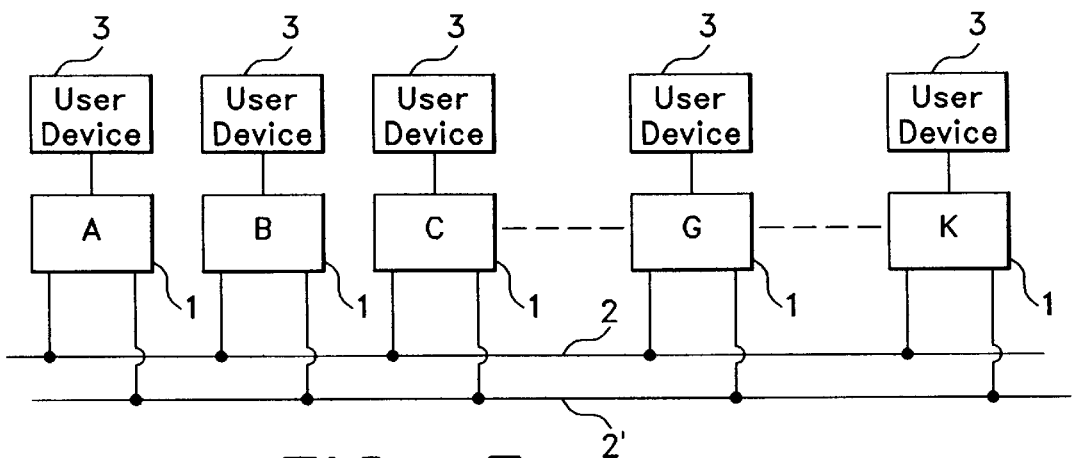
FIG. 1 shows schematically the overall design of an apparatus according to the invention.

According to FIG. 1, a number of stations are connected to a—preferably dual bi-directional—bus 2,2'. The stations are organized in a decentralized manner and, if possible, designed identically. The identical design of the station is, however, not of major importance, but merely simplifies the design of the system and makes it more cost effective. It would be possible to establish stations of different intelligence along the busses 2, 2'. User devices 3 are connected to the stations 1. The individual stations 1 are arranged in a certain order in which they transmit data packets to the bus 2, 2'. The order is determined arbitrarily or at random before the transmission begins, or corresponds to the physical set-up of the stations along the bus 2, 2', whereby the latter arrangement has advantages for the transmission in long bus systems.

Further, according to FIG. 1, letters A, B, C ... G ... K are assigned to the individual stations 1. The stations could, for instance, send data packets to the bus within the time window in a frame which is allocated to them, with the letters alphabetically arranged; it could, however, also be possible for the stations to send in the order A C B K D E F G H I J.

Before the transmission begins, a master station is selected among the stations 1 according to specified selection criteria. The master station sends a start packet 19 to the bus in order to synchronize the stations and sets via this synchronizing signal the station clock or defines the beginning of the transmission for the individual stations 1. Following the start packet 19 (FIG. 3) is an initial gap 22, during which the master station sends a data packet 22' with signaling data as well as an isochronal data packet 22" with voice and signaling data, whereby the selected master station can itself send data to the individual stations 1. Simultaneously with the start packet begins a frame 20, within which frame 20 time slots 21 are assigned to the individual stations 1, during which the stations can send to the bus 2, 2' a preamble P, a header H, and data bytes D. According to FIGS. 1 and 3, it is presumed that K stations 1 are arranged along the bus 2, 2', such that the time slot 21 of station K is the last time slot within the frame. It may, however, occur that frame 20 is selected to have a longer duration and that during the time period between the data packet of the last station in the order selected and the end of the frame no data at all or only useless or system-internal data are transmitted.

The initial gap 22 between the start packet and the beginning of the time window 21 which is assigned to the station transmitting immediately following the master station, accommodates preferably the system-internal communication and transmission of signaling data.

The data packets sent to the bus 2, 2' by the individual stations 1 comprise a preamble P, which preferably does not consist of more than 2 bytes; the header of such data packet contains 2 to 3 bytes, such that—with a preferred overall length of the data packets of 22 bytes—17 to 18 bytes are available for the transmission of data. The preamble and the header are therefore considerably shorter in comparison with the Ethernet data packets shown in FIG. 3a.

These Ethernet data packets comprise a preamble with a specified length of 8 bytes and a header with a specified length of 14 bytes. For the data which follow, between 46 and 1500 bytes are available, such that the entire frame has a length of between 68 and 1522 bytes. The Ethernet data packet shown in FIG. 3a comprises 8 bytes for the preamble as well as 13 bytes for the header and 1500 bytes for data.

Figure 3:
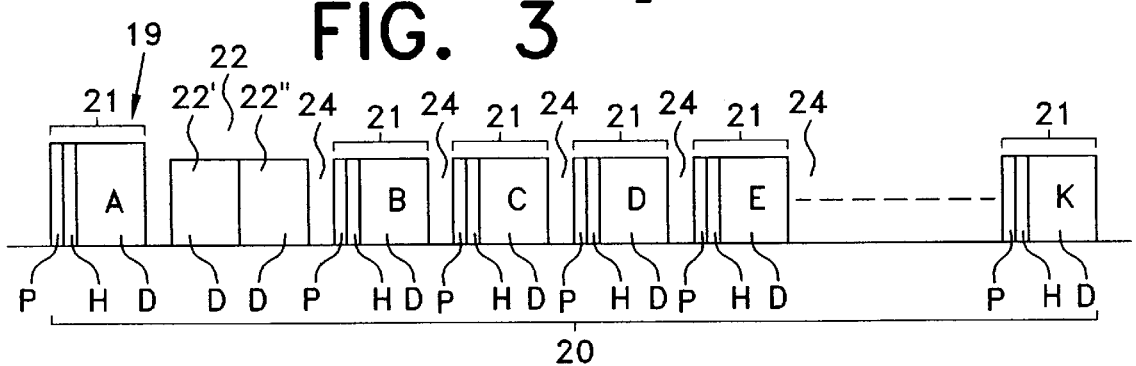
Figure 3A:
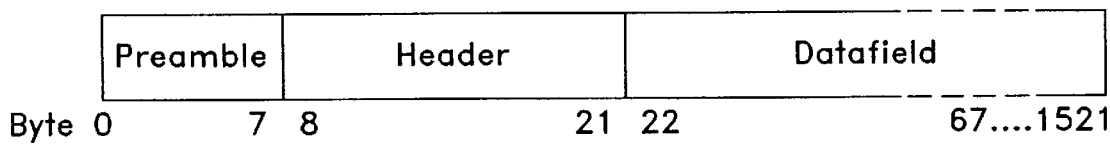
Figure 3B:
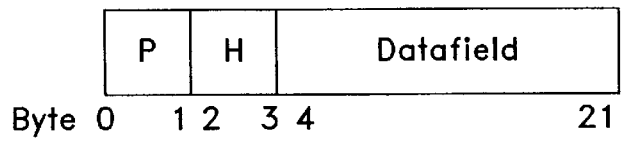

FIG. 3b shows the kind of data packet which is transmitted according to the invention, which shows 2 bytes for the preamble, also 2 bytes for the header, and 18 bytes for data.

Figure 3C:
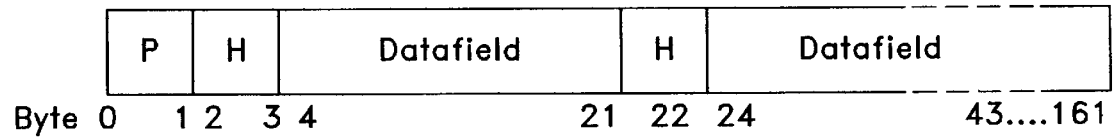

FIG. 3c shows a special case of data packets according to the invention which are transmitted by a station. Such data fields are called "concatenated." A preamble of 2 bytes is followed by a number of data fields with a length of 18 bytes each, wherein each data field is preceded only by a header of 2 bytes. The individual data fields with their headers are transmitted by the sending station consecutively, such that only one preamble is required for all data fields supplied with headers. It is obvious that this station which is sending "concatenated" data packets to the bus, was allocated a corresponding time period within the frame by internal signaling. Preferably, 8 such data packets which are provided with a header, follow a single preamble and are sent together. The total length of such transmission therefore consists of 162 bytes.

By this method, more transmission time can be allocated to a station, and, at the same time, the signaling and protocol data required for data transmission can be reduced.

Figure 2:
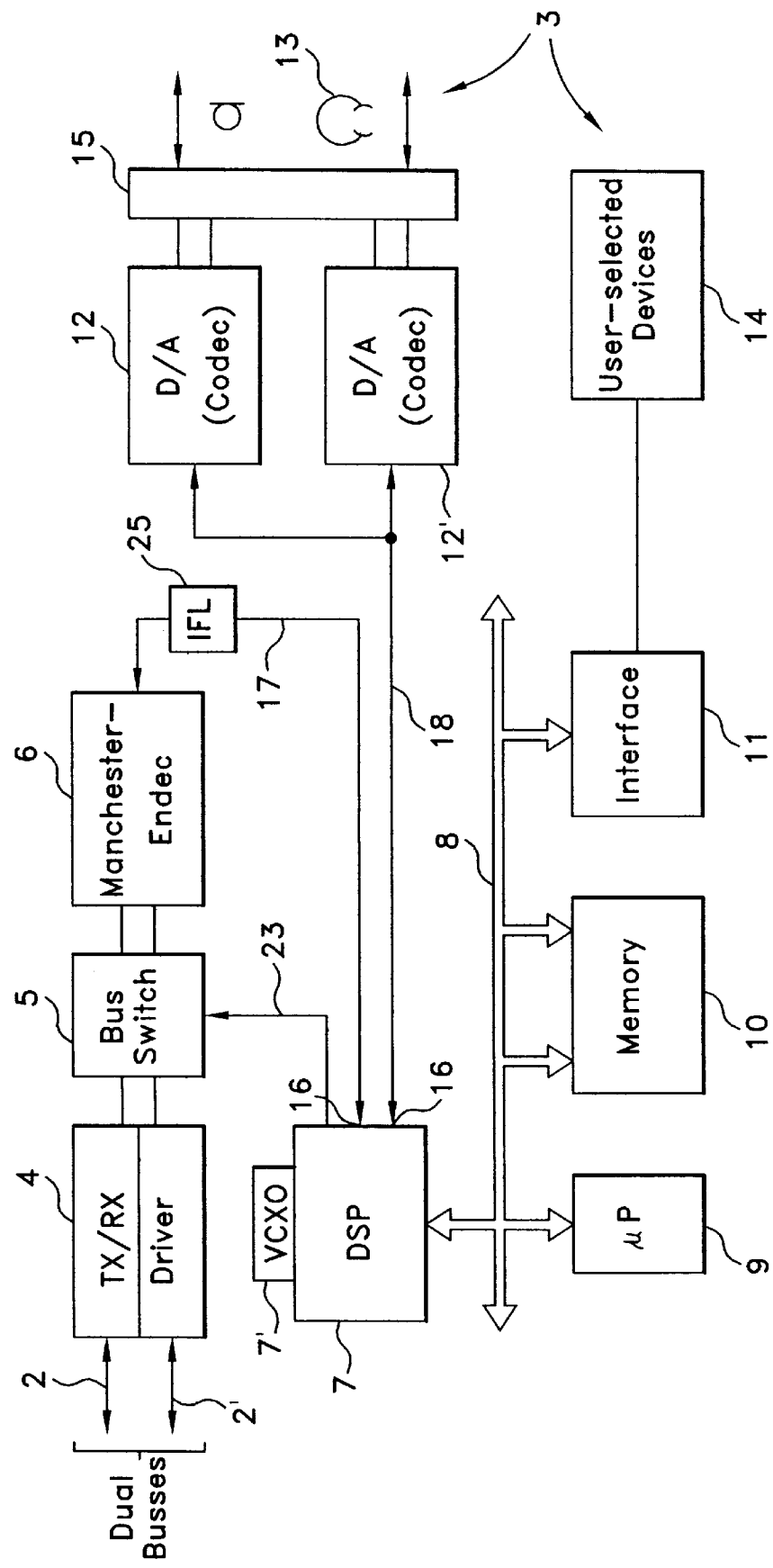
FIG. 2 shows a schematic circuit diagram of a station of an apparatus according to the invention.

FIG. 2 shows schematically the design of a station 1. Each of the individual stations 1 is connected to the bus system 2, 2' via one TX/RX driver 4. A Manchester-Endec 6 is connected to the driver 4 via a bus switch 5, with the Endec connected via an interface bus 17 to a digital signal processor 7—specifically to an S-PORT—which represents the data processing device of the station. At least one D/A converter 12, e.g. Codec, for signaling data and at least one D/A converter 12', e.g. Codec, for voice data are connected to another S-PORT 16 of the digital signal processor 7 via an interface bus 18. Transmitted signaling data mainly comprise PTT, squelch, and similar signals.

The digital signal processor 7 is connected to a microprocessor 9 and corresponding volatile and non-volatile memory 10 via an internal bus 8. User devices, e.g. keyboard, touch screens, keypads, and other user-selected devices 14, are connected via an interface 11. All devices 13 and 14 or headsets which are accessible to the operator, as well as the line interfaces and wireless interfaces, are labeled 3; in FIG. 1, these are indicated separately from the stations 1—since they represent the interface between the stations 1 and the outside world.

The digital signal processor 7 is connected to the selector switch 5 via a line 23, and the reception is switched in specified time intervals from one bus to the other bus in order to assess if the bus lines 2, 2' are functioning properly. Therefore, data are always transmitted over both busses 2, 2', such that the switching process cannot interrupt the transmission, but considerably increases the redundancy of the system.

The transmission of data packets with shortened preambles is enabled by device 6 which is designed to recognize shortened preambles; such device 6 is implemented in a simple and reliable manner via a Manchester decoder.

In order to recognize the start packet sent to the bus 2, 2' by the master station, an identification device, preferably a memory for a preset number, which could, for instance, be incorporated in memory device 10, is assigned to the data processing unit 7. The data processing unit 7 comprises a clock 7' which is adjusted in a fixed phase relationship to the station timing of the other stations 1 when it receives the start packet 19. This clock 7' is preferably implemented as a VCXO, whose frequency is adjustable by changing the operating voltage.

The data sent by the users via the input devices 3 are supplied to a data processing unit 7 which is internal to the station, and from there—if desired, after processing in microprocessor 9—transmitted, via the S-PORT 16 and the line 17, to the Manchester-Endec or to device 6 which arranges the data in packets and assigns corresponding preambles and headers. The Tx/Rx send the data packets to the bus 2, 2'. The individual stations can only transmit during their assigned time windows 21; it is, however, guaranteed that the stations 1 are ready to receive data packets sent over the bus 2, 2' without interruption, except when they are transmitting themselves.

A notification by the stations of their intended transmission times or a sender identification are not required, since transmission of the start signal and the order initially assigned to the stations determines exactly when each station can transmit; and each station can therefore also recognize from which station the message originates. When a station is not sending data, then the time window 21 for that station is not utilized, and the following station—according to the assigned order—begins to transmit during the following time window 21, etc.

According to FIG. 3, time intervals 24 where no transmission takes place, are provided between the individual time windows 21 assigned to the individual stations 1. This transmission-free interval 24 allows to compensate for possible inaccuracies in the clock pulse of the individual stations and for time differences in the signal propagation due to different distances between the individual stations 1 on the bus 2, 2'. The start packet sent by the master station has different propagation times to the individual stations 1; and similar differences in the propagation times occur when the data packets are sent by the individual stations 1; these differences, however, are substantially compensated for as a result of synchronization with the start packet and when data packets are sent.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A method for transmitting data assembled in data packets including at least one of preamble, header, data and/or signal bytes via a dual bi-directional bus between a plurality of decentralized stations having substantially equivalent components and connected to the bus, wherein the dual bidirectional bus has identical bus components and identical data transmission functions for redundancy, the plural decentralized stations receiving the data for transmission from a corresponding plurality of connected peripheral devices, and the plural decentralized stations transmit received data via the plural peripheral devices, and wherein a station clock is synchronized by a synchronizing signal transmitted from a master station, comprising the steps of:

a) selecting a master station from the plural decentralized stations to generate a start packet in a frame during a master station selection mode, wherein each of the decentralized stations is capable of operating as the master station, for transmitting to the bus with a specified repeat frequency a respective start packet defining the beginning of each frame;

b) arranging the plural decentralized stations into a specified order;

c) assigning consecutive time windows to each of the plural decentralized stations having substantially equivalent components, with the assigning of consecutive time windows being in the specified order within the frame generated by the selected master station, during which time windows the individual stations transmit the data packets to the bus;

d) using the start packet which determines the beginning of the frame, for the plural decentralized stations as a synchronizing signal and basis for the respective station clock or the timing in the respective station; and e) transmitting the data;

wherein for the respective station or in each station where an absence of a start packet is detected, a start packet is formed and transmitted to the bus and the station which was the first to send a new start packet to all stations is recognized as a new master station.

2. The method according to claim 1, further comprising the steps of a) adjusting one of at least the clock which is independently generated in each of the plurality of stations, and the frequency, as forming the basis for the clock, depending on the time difference between the expected and the actual arrival time of the start packet;

b) adjusting the clock of the each of the plurality of stations according to the arrival of the start packet.

3. The method according to claim 2, further comprising the steps of a) arranging the plurality of stations along a bus according to at least one of serial number, identification number, sequence and physical order; and b) transmitting the data packets by the plurality of stations in the arrangement according to step a) in sequential order to the bus during the assigned time window of the frame.

4. The method according to claim 3, wherein the master station is selected from the plurality of stations by being located at the beginning or at the end of the bus.

5. The method according to claim 1, wherein only a limited number of data packets having different lengths is transmitted by the plurality of stations.

6. The method according to claim 1, wherein at least one of the length and position of the time window assigned to the individual stations within the frame via the transmission can be changed via the transmission of demand notifications between the plurality of stations.

7. The method according to claim 1, wherein the data packets have substantially 22 bytes and have preambles of substantially 2 bytes, and with shortened headers of substantially 2 to 3 bytes.

8. The method according to claim 1, wherein the data packets comprises a preamble having a byte count of at most 10% of the total length of the data packet.

9. The method according to claim 1, wherein the data packets comprises a header having a byte count at most 15% of the total length of the data packet.

10. The method according to claim 1, wherein a signal transmission is initiated from at least one of the plurality of stations operating in a master station selection mode for selecting a new master station, whereby after a time period exceeding the duration of a frame has passed and no start packet was received during the time period, a start packet is formed and transmitted to the bus from each of the plurality of stations, wherein a first station to send a respective start packet as the first start packet during the master station selection mode is recognized and selected by the plurality of stations to be the master station.

11. The method according to claim 1, wherein with the transmission of the start packet, the station clocks in each of the plurality of stations is adjusted in a fixed phase relationship.

12. The method according to claim 1, further comprising the step of selecting for a number of data channels between 5 and 1000, and a transmission capacity between 4 kbits/s and 8.5 Mbits/s per channel, a frame frequency between 100 and 1000 Hz, and a length of a packet between 12 and 84 bytes.

13. The method according to claim 1, wherein a bus is employed with a bandwidth between 1 and 155 Mbits/s.

14. The method according to claim 1, wherein a time window is provided within the frame between the start packet and the time window assigned to the first station transmitting after the master station, for the transmission of system data and/or system signals between the stations, for assigning and changing time slots, or for transmitting system parameters.

15. The method according to claim 1, further comprising the step of creating data packets such that, following a single preamble which is shortened compared to Ethernet preambles, is a plurality of consecutive data packets without preambles and each having only one header which is shortened in comparison with Ethernet headers.

16. The method according to claim 15, wherein in each station, the data between the station-internal data processing unit and the bus are routed via a device, which recognizes the preambles.

17. The method according to claim 1, wherein in each station the start packets which are transmitted at the beginning of each frame, are compared with a preset fixed value for identification and if the identification is positive, the station-internal clock is adjusted using the start packet so as to set a time reference for the transmission time window.

18. The method according to claim 1, wherein the device which recognizes the shortened preambles, supplies the data to or extracts the data from the data processing unit which comprises a digital signal processor and/or a microcontroller, via the S-PORT.

19. A method for transmitting data assembled in data packets including at least one of preamble, header, data and signal bytes via a dual bi-directional bus between a plurality of decentralized stations connected to the bus, wherein the plural decentralized stations receiving the data for transmission from a corresponding plurality of connected peripheral devices, and the plural the decentralized stations transmit received data via the plural peripheral devices, and wherein a station clock is synchronized by a synchronizing signal transmitted from a master station, comprising the steps of:
- a) selecting a master equivalent station from the plural decentralized stations for transmitting to the bus with a specified repeat frequency a start packet defining the beginning of a frame;
- b) arranging the plural decentralized stations into a specified order;
- c) assigning consecutive time windows to each of the plural decentralized stations in the specified order within the frame generated by the selected master station, during which time windows the individual stations transmit the data packets to the bus;
- d) using the start packet which determines the beginning of the frame, for the plural decentralized stations as a synchronizing signal and basis for the respective station clock or the timing in the respective station; and
- e) transmitting the data;

wherein for the respective station or in each station where an absence of a start packet is detected, a start packet is formed and transmitted to the bus, and the station which was the first to send a new start packet to all stations is recognized as a new master station.

20. The method according to claim 14, wherein the length of the initial gap is at least twice the end to end propagation delay of the bus plus the transmission time of the packets.

21. The method according to claim 16, wherein the preambles are selected from the group consisting of Manchester encoded preamble, 3B4 encoded preambles and BB10 encoded preambles.

22. The method according to claim 15, wherein the single preamble is about 2 bytes, the consecutive data packets comprise not more than 8, each having a total length of about 17 to 18 bytes, without preambles, and each header comprises about 2 to 3 bytes.

23. An apparatus for transmission of data, comprising:
- a dual bi-directional bus having identical bus components and identical data transmission functions for redundancy;
- a plurality of stations connected to the bus;
- peripheral devices connected to each of the plural stations; and
- each of the plural stations is capable of operating as a master station, wherein each of the stations includes a data processing unit including a clock or a timing reference, wherein the clock or timing reference of each of the plural stations is synchronized and adjusted by a synchronizing signal transmitted from the master station;
- said data processing unit of each of the plural stations further comprising an identification device for recognizing a start packet defining the beginning of a frame, to which identification device the clock is connected such that the clock is adjusted with the start packet, wherein for the respective station or in each station where an absence of a start packet is detected, a start packet is formed and transmitted to the bus, and the station which was the first to send a new start packet to all stations is recognized as a new master station.

24. The apparatus according to claim 23, wherein the data processing unit comprises an S-PORT and wherein the decoding means is connected to the S-PORT.

25. The apparatus according to claim 23, further comprising an interface logic connected between the data processing unit and the device, the interface logic being used for identifying preambles, for framing packet for the DSP for determination of the first data bit and the end of the preamble.

26. The apparatus according to claim 23, wherein the means for decoding is a Manchester decoder.

27. The apparatus according to claim 23, wherein the means for recognizing preambles is for detecting signal presence, recovery of data timing and recovery of received data.

28. The apparatus according to claim 23, wherein the means for recognizing preambles is an encoder-decoder unit.

29. The apparatus according to claim 23, wherein the plurality of the stations are decentralized.

30. The apparatus according to claim 23, wherein the peripheral devices is selected from the group consisting of telephone equipment, microphones, loudspeakers, keyboards, line interfaces and wireless equipment.

31. The apparatus according to claim 28, wherein the encoder-decoder unit is a Manchester decoder.

32. An apparatus for transmission of data, comprising:
- a dual bi-directional bus;
- a plurality of peripheral devices; and
- a plurality of stations having substantially equivalent components and arranged in a decentralized configuration with a specified order, wherein one of the plural stations is selected to operate as a master station, each of the stations being connected to the bus with the plural peripheral devices connected to each of the plural stations, wherein each of the stations includes:
    - a data processing unit having:
        - a timing reference mechanism synchronized and adjusted by a synchronizing signal transmitted from the master station, the timing reference mechanism being adjustable in response to detection of a start packet in a frame; and
        - an identification device connected to the timing reference, the identification device for recognizing the start packet defining the beginning of the frame transmitted by the respective station;
- wherein the master station transmits start packets defining the beginning of respective frames to the bus at a predetermined repeat frequency;
- wherein the timing reference mechanism of each data processing unit of each respective station accepts the start packets as synchronizing signals for establishing respective timing operations in each respective station;
- wherein each respective frame is divisible into consecutive time windows;
- wherein each respective station is assigned to at least one of the time windows, and each respective station transmits data packets to the bus in the assigned time window thereof; and
- wherein for the respective station or in each station where an absence of a start packet is detected, a start packet is formed and transmitted to the bus, and the station which was the first to send a new start packet to all stations is recognized as a new master station.

33. The method according to claim 14, wherein, in assigning and changing time slots, at least one space is provided between the time slots to avoid overlap of the time slots.

34. The apparatus according to claim 23, wherein each of the plurality of stations comprises means for recognizing preambles which are shortened compared to Ethernet preambles, and which means is connected between the data processing unit and the dual bus.

* * * * *